US007969827B2

(12) United States Patent
Pratt et al.

(10) Patent No.: US 7,969,827 B2
(45) Date of Patent: Jun. 28, 2011

(54) REMOVABLE STORAGE MEDIA DRIVE FEATURE ENABLING SELF TEST WITHOUT PRESENCE OF REMOVABLE MEDIA

(75) Inventors: Thomas L. Pratt, Austin, TX (US); Christiaan Steenbergen, Austin, TX (US); David M. Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 410 days.

(21) Appl. No.: 12/205,043

(22) Filed: Sep. 5, 2008

(65) Prior Publication Data

US 2008/0320337 A1 Dec. 25, 2008

Related U.S. Application Data

(63) Continuation of application No. 10/226,934, filed on Aug. 23, 2002, now Pat. No. 7,430,154.

(51) Int. Cl.
*G11B 21/08* (2006.01)

(52) U.S. Cl. ....................................... 369/30.27; 714/42

(58) Field of Classification Search ............... 369/30.27, 369/30.28, 30.29, 30.42, 30.53, 44.23, 112.12; 714/42, 4, 43, 48; 710/74
See application file for complete search history.

(56) References Cited

U.S. PATENT DOCUMENTS

| | | | | |
|---|---|---|---|---|
| 5,754,503 | A | 5/1998 | Senba et al. | 369/44.23 |
| 5,953,309 | A | 9/1999 | Yoshimoto et al. | 369/275.3 |
| 6,430,125 | B1 | 8/2002 | Alon et al. | 369/44.32 |
| 6,982,405 | B2 | 1/2006 | Erickson et al. | 250/214 R |
| 7,430,154 | B2 * | 9/2008 | Pratt et al. | 369/30.27 |

* cited by examiner

*Primary Examiner* — Ali Neyzari
(74) *Attorney, Agent, or Firm* — Baker Botts L.L.P.

(57) ABSTRACT

A method, system and apparatus for testing a removable storage media drive device are disclosed. According to teachings of the present disclosure, a simulated storage media may be disposed within a removable storage media drive device. In the event removable storage media is not present in the drive device when testing of the device is desired, the simulated storage media may be substituted for at least purposes of testing the operability of one or more device components. In one embodiment, the simulated storage media may be in the form of an annular ring of CD-ROM material. In a further embodiment, the simulated storage media may be in the form of a hologram designed to mimic one or more removable storage media characteristics.

20 Claims, 4 Drawing Sheets

REMOVABLE STORAGE MEDIA DRIVE FEATURE ENABLING SELF TEST WITHOUT PRESENCE OF REMOVABLE MEDIA

RELATED APPLICATION

This application is a Continuation of U.S. application Ser. No. 10/226,934, filed Aug. 23, 2002, now U.S. Pat. No. 7,430, 154. The contents of that application are incorporated herein in their entirety by this reference.

TECHNICAL FIELD

The present disclosure relates generally to testing information handling systems and, more specifically, to a method and system for testing a removable storage media drive device in an information handling system.

BACKGROUND

As the value and use of information continues to increase, individuals and businesses seek additional ways to process and store information. One option available to users is the information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

Personal computer ("PC") systems in general and IBM compatible personal computers in particular are types of information handling systems that have attained widespread use. These information handling systems handle information and primarily give independent computing power to a single user (or a relatively small group of users in the case of a PC network). Such information handling systems are typically inexpensively priced and provide computing power to many segments of today's modern society.

An information handling system can usually be defined as a desktop, floor-standing, or portable microcomputer that includes a system unit having a central processing unit ("CPU" or a "processor"), volatile and/or non-volatile memory, a display monitor, a keyboard, one or more floppy diskette drives, a hard disc storage device, an optional DVD or CD-ROM drive, and an optional printer. An information handling system typically also includes a commercially available operating system, such as Microsoft Windows NT or Linux. An information handling system may also include one or more input/output ("I/O") devices coupled to the system processor to perform specialized functions. Examples of I/O devices include, but are not limited to, keyboard interfaces with keyboard controllers, floppy diskette drive controllers, modems, sound and video devices, and specialized communication devices.

Personal computers typically include peripheral storage devices such as disc drives using removable storage media. The removable storage media is typically used to store and/or load software, data, and documentation. Examples of disc drives with removable storage media include CD-ROM, CD-RW, DVD-ROM, floppy, Zip disc and removable hard disc drives.

The personal computer (PC) aspect of the information handling system business is rapidly moving toward "build-to-order" manufacturing. In such an environment, the customer typically enters a purchase order for a PC by selecting specific options such as CPU model/speed, memory size, hard disc drive size, peripheral devices such as display monitor size, resolution, keyboard, CD-RW, DVD, printers as well as others. The PC purchase order usually includes a choice for an operating system such as Windows ME™, Windows 2000™ or in some cases Linux. In the build-to-order manufacturing environment, the PC manufacturer assembles the PC hardware in compliance with the purchase order.

After completion of the hardware and software assembly process, an information handling system typically undergoes extensive inspection and testing. The PC manufacturer typically ships the custom manufactured PC to the customer within a few days after receipt of a purchase order. Typically, a PC manufacturer may ship several thousand "build-to-order" PCs or information handling systems every day.

During the manufacturing process of a personal computer, the inspection and testing phase is typically important to identify product defects. Generally, it is more cost effective to identify and fix product defects before shipment to a customer site. Testing personal computer peripheral devices such as disc drives with removable storage media can be time-consuming. For example, the testing phase of the CD-ROM device typically involves manually inserting a test CD-ROM in the drive and conducting the test procedure. The "build-to-order" manufacturing process of a personal computer as well as the manufacturing line for removable storage media drive devices themselves typically involve an assembly line operation capable of producing thousands of units each hour. The step of manually inserting removable media for test purposes typically slows down the manufacturing process, is a potential source of false failures, and adds to product costs.

FIG. 1A is a schematic diagram generally illustrating the structure of one type of removable storage media drive device, CD-ROM drive 100. As illustrated in FIG. 1A, a spindle motor 102 is preferably included in CD-ROM drive 100 to rotate CD-ROM disc 104 (CD-ROM) when properly seated on turntable 106. For purposes of the present disclosure, CD-ROM 104 may be used to refer to a CD-ROM, a DVD-ROM, a CD-RW, other optical media as well as magnetic and other forms of storage media.

Generally upon inserting CD-ROM disc 104 in CD-ROM drive 100, a clamp assembly 108 may be used to secure the position of CD-ROM disc 104 on turntable 106 such that CD-ROM disc 104 may be frictionally coupled to turntable 106. Several types of clamp mechanisms 108 are available and the type chosen typically depends on the dimensions of CD-ROM drive 100. A disc controller 112 operable to control overall CD-ROM disc drive system 100, including spindle motor 102 and sensor device 110, is also preferably included. Disc controller 112 typically includes a microprocessor (not expressly shown) or a digital signal processor (not expressly shown) configured to control the operation of CD-ROM disc drive 110.

For CD-ROM and DVD-ROM read only devices, one or more low-power laser diodes, a lens, a focusing coil, other optical elements and a light detecting device (not expressly shown) are typically included in sensor device assembly 110, for example. For CD-RW and other recordable optical devices, sensor device assembly 110 is similar with a laser diode capable of pulsing to higher power for writing information to a disc, for example.

Conventionally, information is encoded in a spiral track (not expressly shown) contained on one side of CD-ROM disc 104. The spiral track is typically read optically by sensor device 110, which includes a non-contact head, and which scans approximately radially as the CD-ROM disc 104 spins above it.

FIG. 1B is a schematic diagram illustrating land 118 and pit 116 formations included in a typical spiral track of CD-ROM disc 104. In one embodiment, CD-ROM disc 104 preferably includes a disc substrate 114 in which pits 116 and lands 118 may be formed to store information. Generally to enable information or data to be read by a laser of sensor device 110, a reflective layer 120 is preferably deposited on disc substrate 114. Typically disposed on reflective layer 120 is protective layer 122. Finally, many CD-ROM discs 104 may be finished with a disc label 124 disposed on protective layer 122.

In general, a CD-ROM spiral track contains shallow depressions, a depression being referred to as a pit 116, in a reflective layer 118. The length of these pits and the length of the areas between them, often called land 118, may be combined to encode binary information. During a read operation, a low power laser from sensor device 110, also referred to as an optical head in the case of a CD-ROM disc drive 100, is focused on the spiral track and may be reflected back into a light detection diode of sensor device 110. Due to the optical characteristics of the disc and the wavelength of light used, the quantity of reflected light varies depending on whether the beam is on land 118 or pit 116. The modulated, reflected light may then be converted to a radio frequency, raw data signal by the light detector diode (not expressly shown) of sensor device 110. Other optical devices, such as a CD-RW recordable device, DVD-ROM read devices and recordable DVD devices, operate in essentially the same manner except where pits 116 may be replaced by a spiral groove (not expressly shown) which may contain written marks.

SUMMARY

In accordance with teachings of the present disclosure, a system and method are described for testing one or more operational characteristics of a removable storage media drive device. A method of the present disclosure preferably includes integrating a simulated storage media within the removable storage media drive device and commanding at least one device component to access the simulated storage media.

In another aspect of the present disclosure, an information handling system is provided. The information handling system preferably includes at least one processor, memory and a removable media storage device operably coupled to both the processor and the memory. A simulated storage media is preferably disposed proximate the removable storage media device. A program of instructions storable in the memory and executable by the processor is also preferably included where the program of instructions, in conjunction with the simulated storage media, is operable to test at least one component of the removable storage media device.

In a further aspect, a removable storage media device having a sensor device operable to read removable storage media when positioned substantially within a sensing range of the sensor device and a simulated storage media disposed proximate the sensor device is also provided by the present disclosure. The simulated storage media is preferably operable to cooperate with the sensor device to test at least one operational aspect of the removable storage device.

In yet another aspect, an optical media drive having a simulated optical media and an optical sensor device having a sensing range, the optical sensor device disposed proximate the simulated optical media, is also provided. In such an embodiment, the simulated optical media and the optical sensor device, in conjunction, are preferably operable to test at least one operational aspect of the optical media drive.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood with reference to FIGS. 1 through 5, wherein like numbers may be used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, one or more disk drives, and/or other types of nonvolatile memory. Additional components of the information handling system may include one or more network ports for communicating with external devices as well as various input and output (I/O) devices, such as a keyboard, a mouse, and a video display. The information handling system may also include one or more buses operable to transmit communications between the various hardware components.

Figure 1A:
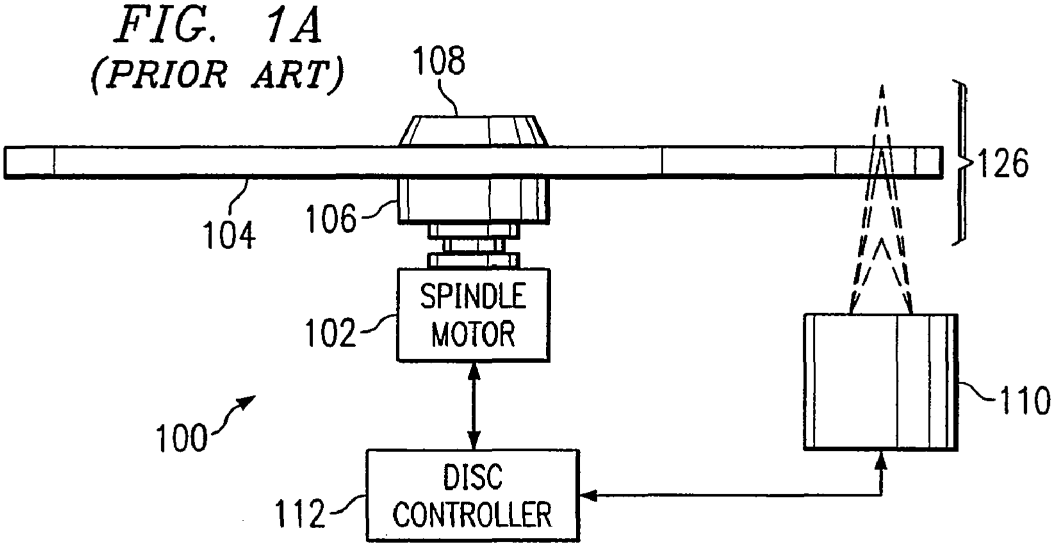
FIG. 1A is a schematic diagram generally illustrating a CD-ROM disc drive.
Figure 1B:
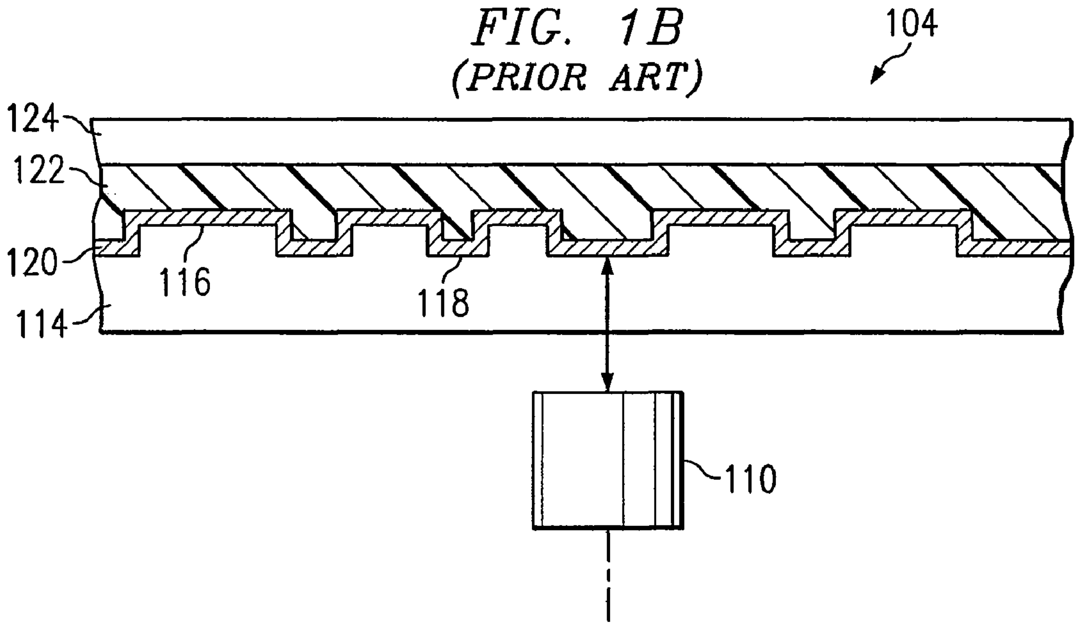
FIG. 1B is a schematic diagram generally illustrating a segment of a CD-ROM spiral track.
Figure 2:
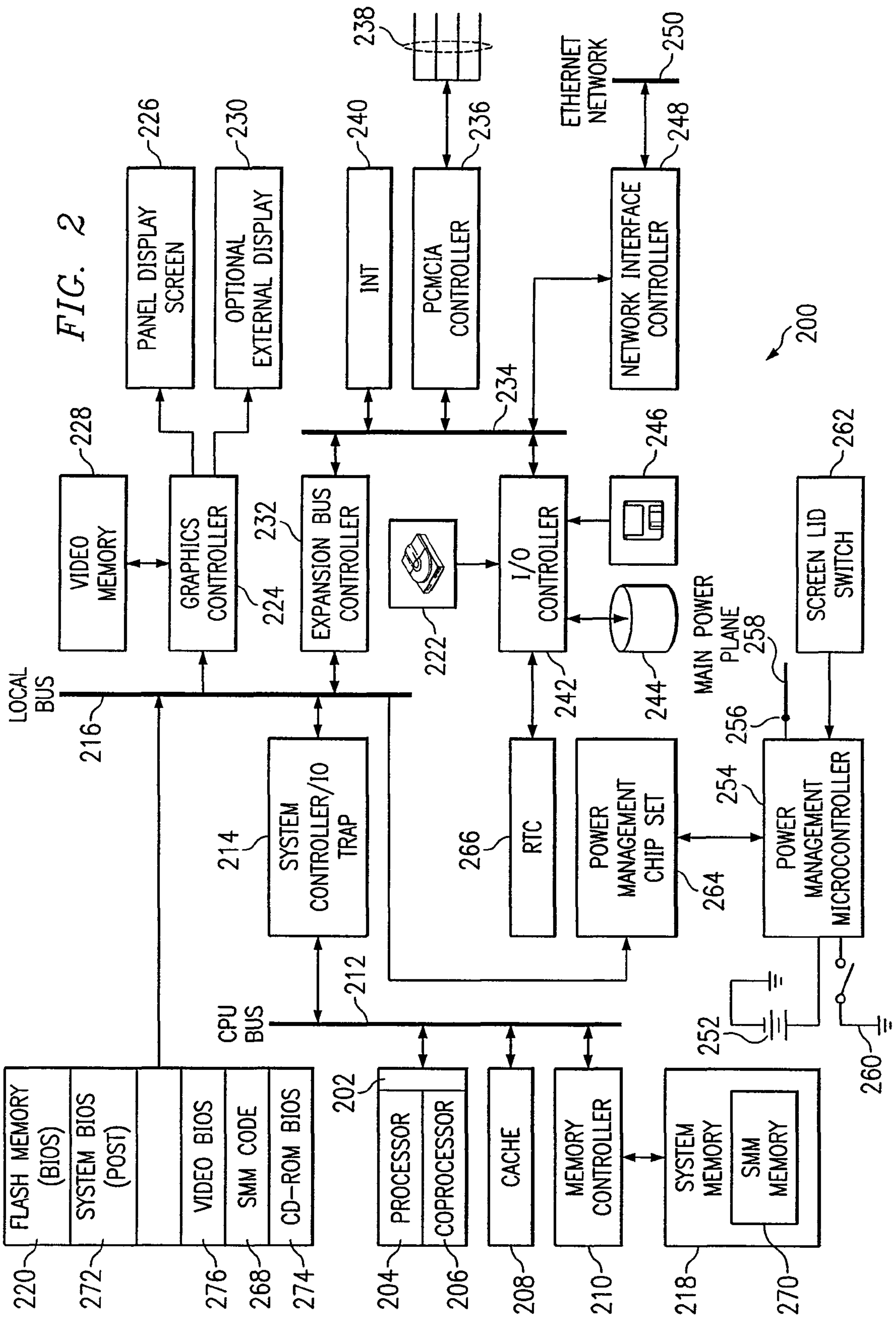
FIG. 2 is a block diagram illustrating an information handling system incorporating teachings of the present disclosure.

Referring to FIG. 2, one embodiment of an information handling system incorporating teachings of the present disclosure is shown. In general, information handling system 200 preferably includes a microprocessor ("CPU") 202, for example, an Intel Pentium™ class microprocessor or Intel 80486™ class microprocessor, having a processor 204 for handling integer operations and a coprocessor 206 for handling floating point operations. CPU 202 is preferably coupled to cache 208 and memory controller 210 via CPU bus 212. System controller input/output (I/O) trap 214 preferably couples CPU bus 212 to local bus 216 and may be generally characterized as part of a system controller such as a Pico Power Vesuvious or an Intel™ Mobile Triton chip set. System controller I/O trap 214 may be programmed to intercept a particular target address or address range, and, upon interception, system controller I/O trap 214 may assert an intercept signal indicating that CPU 202 attempted to access the target address.

Main memory 218 of dynamic random access memory ("DRAM") modules is preferably coupled to local bus 216 by memory controller 210. Main memory 218 preferably includes a system management mode memory area (not expressly shown) which may be employed to store converter code operable to implement one or more conversion methodology embodiments.

BIOS memory 220 is preferably provided and coupled to local bus 216. A FLASH memory or other nonvolatile memory may be used as BIOS memory 220. A BIOS program (not expressly shown) is commonly stored in BIOS memory 220. The BIOS program typically includes software for interaction with information handling system boot devices such as the keyboard, mouse, hard disc drive or CD-ROM device 222. BIOS memory 220 preferably stores system code operable to control one or more information handling system 200 operations.

A graphics controller 224 is also preferably provided in information handling system 200 and coupled to local bus 216 as well as panel display screen 226. Graphics controller 224 is also provided and preferably coupled to video memory 228. Video memory 228 is preferably operable to store information to be displayed on panel display 226. In a mobile computing environment, panel display 226 is preferably an active matrix or passive matrix liquid crystal display ("LCD"), however, other display technologies may be employed. Graphics controller 224 may also be coupled to an external or standalone monitor or display 230.

A bus interface controller or expansion bus controller 232 preferably couples local bus 216 to expansion bus 234. In one embodiment, expansion bus 234 may be an Industry Standard Architecture ("ISA") bus although other buses, for example, a Peripheral Component Interconnect ("PCI") bus, may also be used. A personal computer memory card international association ("PCMCIA") controller 236 is also preferably included and coupled to expansion bus 234 as shown. For expandability of information handling system 200, PCMCIA controller 236 may be coupled to a plurality of expansion slots 238 configured to receive one or more PCMCIA expansion cards (not expressly shown) such as modems, fax cards, communications cards, and other I/O devices. Interrupt request generator 240 may also be provided and coupled to ISA bus 234 and is preferably operable to issue an interrupt service request over a predetermined interrupt request line after receiving a request to issue an interrupt instruction from CPU 202.

An I/O controller 242, often referred to as a super I/O controller, is preferably provided and coupled to ISA bus 234. I/O controller 242 may interface with integrated drive electronics ("IDE") hard disc drive 244, CD-ROM drive 222 and/or floppy drive 246. Other removable storage media drive devices (not expressly shown) which may be interfaced with the I/O controller include, but are not limited to, a removable hard disc drive, a Zip drive, a CD-RW disc drive, and a CD-DVD disc drive.

As illustrated in FIG. 2, a network interface controller 248 operable to enable information handling system 200 to communicate with a computer network such as Ethernet network 250 is provided. Ethernet network 250 may include a local area network ("LAN"), wide area network ("WAN"), Internet, Intranet, wireless broadband and/or other network constructs. Network interface controller 248 generally provides a network interface for communicating with other information handling systems (not expressly shown) connected to Ethernet network 250. Information handling system's 200 networking components generally include hardware as well as software components. Examples of hardware components include, but are not limited to, network interface controller 248 and Ethernet network 250. Examples of software components, may include, but are not limited to, messaging services and network administration services.

Information handling system 200 may be used as a controller for resolving proprietary and standard event and message structures into a common format for use by a computer network in a plurality of management purposes. Information handling system 200 may be connected with a plurality of information handling systems in a network and configured to receive messages from the information handling systems, analyze the messages and determine an effective utilization of the messages as directed by a user or network administrator. Information handling system 200 is preferably operable to receive messages in different message formats, organize the messages, and convert the messages into a common format to assist a user, system administrator, or network administrator in utilizing the information contained in the messages. Information handling system 200 preferably supports the conversion of messages into the common format to facilitate particular network applications.

As illustrated in FIG. 2, information handling system 200 includes a power supply 252, for example, a battery, operable to provide power to the many devices which form information handling system 200. In a mobile computing environment, power supply 252 is typically a rechargeable battery such as a nickel metal hydride ("NiMH") or lithium ion battery. Power supply 252 is preferably coupled to a power management microcontroller 254 operable to control the distribution of power from power supply 252. More specifically, microcontroller 254 preferably includes a power output 256 coupled to a main power plane 258 which supplies power to CPU 202. Power microcontroller 254 may also be coupled to a power plane (not expressly shown) operable to supply power to panel display 226. Microcontroller 254 preferably monitors the charge level of power supply 252 to determine when to charge and when not to charge power supply or battery 252. Microcontroller 254 may be coupled to a main power switch 260 which the user may actuate to turn information handling system 200 on and off. While microcontroller 254 powers down other portions of information handling system 200, e.g., such as hard disc drive 244, when not in use, microcontroller 254 is preferably always coupled to a source of energy, namely power supply 252.

In a portable computing environment, information handling system 200 may also include a screen lid switch or indicator 262 operable to provide an indication of when panel display 226 is in an open position and an indication of when panel display 226 is in a closed position. It should be noted that panel display 226 is preferably located in the same location in the lid of the information handling system as is typical for "clamshell" types of portable computers such as laptop or notebook computers. In this manner, the display screen forms an integral part of the lid of the computer which swings from an open position for interaction with the user to a closed position.

Information handling system 200 preferably also includes a power management chip set 264. Power management chip set 264 is preferably coupled to CPU 202 via local bus 216 so that power management chip set 264 can receive power control commands from CPU 202. Power management chip set 264 may also be connected to a plurality of individual power planes (not expressly shown) operable to supply power to respective devices in information handling system 200 such as hard disc drive 244 and floppy disc drive 246, for example. In this manner, power management chip set 264 acts under the direction of CPU 202 to control the power to various power planes and devices of information handling system 200. Real time clock ("RTC") 266 may also be coupled to I/O controller 242 and power management chip set 264 such that time events or alarms may be transmitted to power management chip set 264. In one embodiment, RTC 266 may also be programmed to generate one or more alarm signals at predetermined times.

When information handling system 200 is turned on or powered up, information handling system 200 typically enters a start up phase, also referred to as a boot up phase, during which available information handling system 200 hardware may be detected and an operating system loaded. During the initial boot stage, the information handling system 200 BIOS software preferably stored in non-volatile BIOS memory 220 may be copied into main memory 218, thereby enabling its execution to be expedited. This memory technique is commonly referred to as "shadowing" or "shadow RAM" as discussed above. Generally at this time, shadow memory mapping (SMM) code 268 is also preferably copied into system management mode memory area 270 of main memory 218. CPU 202 then executes SMM code 268 after CPU 202 receives a system management interrupt ("SMI") causing microprocessor 202 to enter SMM. Additional conditions under which an SMI may be generated are discussed below. It should be noted that along with SMM code 268, also preferably stored in BIOS memory 220 and copied into main memory 218 at power up are system BIOS 272 (including a power on self test module-POST), CD-ROM BIOS 274 and video BIOS 276. According to teachings of the present disclosure, alternative memory mapping schemes may be used. For example, SMM code 268 may be stored in fast SRAM (Static Random Access Memory) (not expressly shown) coupled to local/CPU bus 216.

Generally upon manufacture or assembly of information handling system 200 the hardware and software components included therein are preferably tested to verify their proper operation. The testing of the information handling system 200 generally includes the testing of any removable storage media disc drives, e.g., CD-ROM drive 222 as well as many other system devices. CD-ROM drive 222 testing may be initiated either during the boot up process, after loading the operating system or at some other time. In one embodiment, information handling system 200 may receive a request or command to enter a test mode. In response to receipt of the test mode request, information handling system 200 preferably becomes operable to perform a method for testing a removable storage media drive device incorporating teachings of the present disclosure and described in further detail below.

In one embodiment, information handling system 200 may include a computer-readable medium having a computer program or software accessible therefrom, the computer program including instructions for performing a method of testing an information handling system removable storage media drive device. The computer-readable medium may include any of the following: a magnetic storage medium, including disc and tape storage medium; an optical storage medium, including compact discs such as CD-ROM, CD-RW, and DVD; a non-volatile memory storage medium; a volatile memory storage medium; and data transmission or communications medium including packets of electronic data, and electromagnetic or fiber optic waves modulated in accordance with the instructions.

One objective of the present disclosure is to enable testing of an information handling system 200 removable storage media drive device for proper operation without requiring the presence of removable storage media. According to teachings of the present disclosure, removable storage media may include CD-ROM discs, DVD-ROM discs, CD-RW discs, other removable optical media, removable magnetic media as well as other computing devices which utilize removable storage media and which may benefit from teachings disclosed herein. For example, it is an object of the present disclosure to test CD-ROM drive 222 of information handling system 200 when no CD-ROM disc 104 is present therein. One method which advantageously simulates the presence of storage media for testing purposes when no removable storage media is present is generally depicted in FIG. 3.

Figure 3:
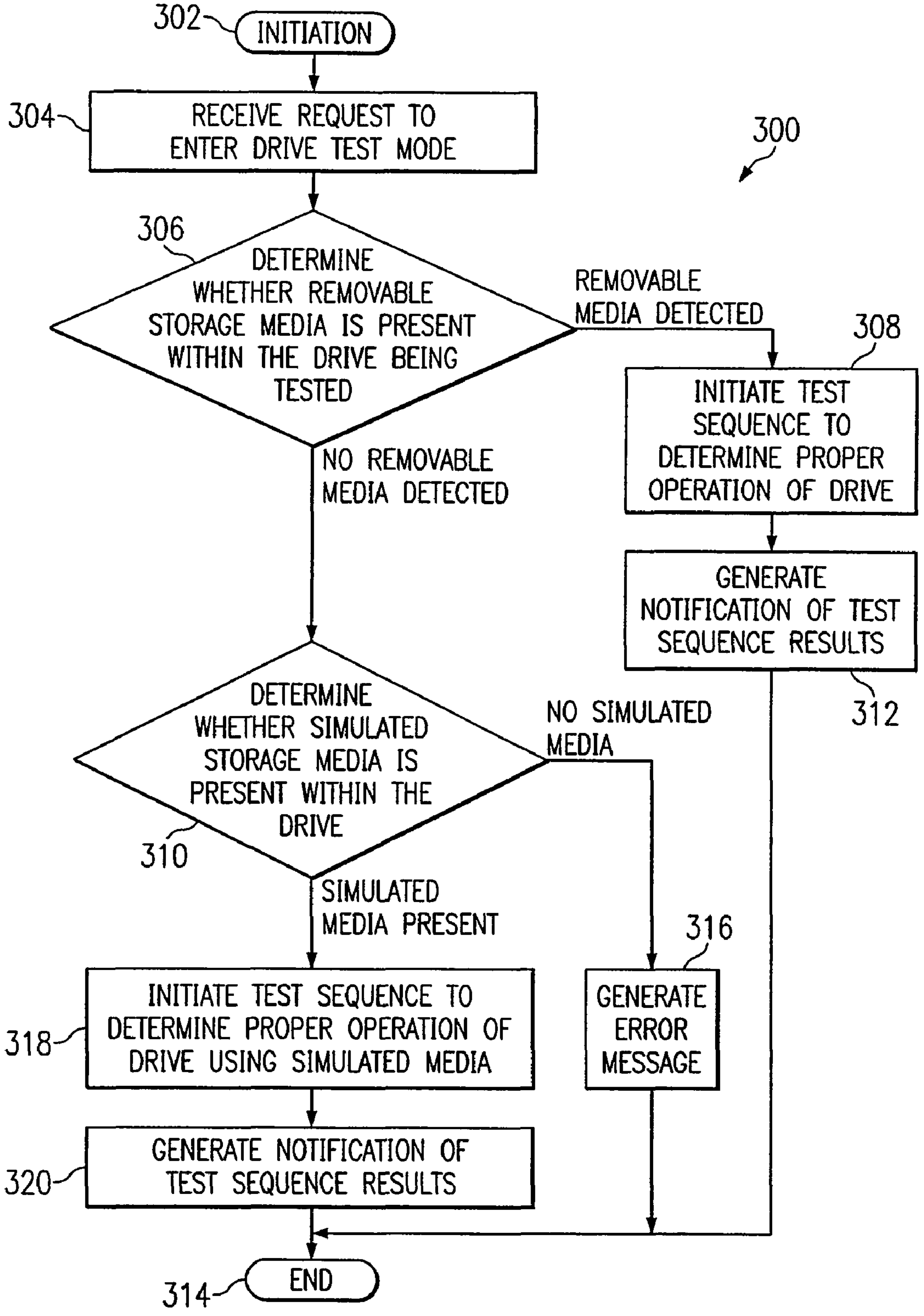
FIG. 3 is a flow chart illustrating a method for testing an information handling system removable storage media drive device according to teachings of the present disclosure.

Referring now to FIG. 3, a flow chart illustrating a method for testing an information handling system having a removable storage media drive device is shown according to teachings of the present disclosure. Method 300 of FIG. 3 may be implemented in an information handling system 200 made in accordance with teachings of the present disclosure using one or more hardwired components, one or more software modules or a combination thereof. In such an information handling system 200, a removable storage media device, e.g., CD-ROM disc drive 222, is preferably provided where the removable storage media device includes at least a portion of simulated storage media, e.g., a simulated portion of a CD-ROM, DVD-ROM, CD-RW, Zip disc, floppy disc, etc.

Simulating storage media within a removable storage media device may be advantageously used when it is desired to test the removable storage media device in the absence of removable storage media. Alternatively, simulating storage media within a removable storage media device may also be used to determine whether removable storage media is present within a drive. In one embodiment, the removable storage media device preferably includes at least one sensor device, e.g., sensor device 110, operable to read data stored on removable media, e.g., a CD-ROM disc 104, as well as on a simulated storage media. For example, if the removable storage media is an optical disc, such as CD-ROM disc 104, a DVD-ROM, or a CD-RW disc, the simulated storage media may provide at least a portion of an optical disc or an apparatus operable to mimic one or more characteristics of removable storage media. In one embodiment, the portion of simulated storage media preferably includes the land 118 and pit 116 formations commonly found on CD-ROM disc 104 and typically used to encode binary information. Alternatively, the simulated storage media may include written marks disposed in a spiral groove, such as those typically found on a DVD-ROM. Other embodiments are also contemplated.

In one embodiment, simulating the storage media within the disc drive may be accomplished by integrating at least a portion of the simulated storage media within the removable storage media device, such as in clamp 108, or in a casing or housing operable to maintain the various devices or components of CD-ROM drive 222 or information handling system 200. The simulated storage media is preferably disposed in or on the removable storage media device such that it may be positioned substantially within the sensing range of sensor device 110, in one embodiment. Other dispositions of simulated storage media are discussed below with respect to FIG. 5. Test data or other readable information may be stored on the simulated media to enable more exhaustive or detailed testing of the removable storage media device. Further, in the case of write operational removable storage media device, the simulated storage media may be operable to receive and retain information written thereto. Alternatively, a hologram created to simulate or mimic one or more CD-ROM characteristics may be similarly situated within the CD-ROM disc drive to effectively simulate the presence of removable storage media as described below with respect to FIG. 5. Other embodiments of simulated storage media are contemplated and considered within the scope of the present disclosure.

As illustrated, method 300 preferably begins upon initialization at 302. As mentioned above, the one or more removable storage media devices included in information handling system 200 may be checked for their proper operation during execution of a POST routine, during the information handling system's 200 initial boot, after the OS has been installed on information handling system 200 as well as at other selected or desired times. Upon initiation at 302, method 300 preferably proceeds to 304.

At 304, a request to enter a removable storage media device or disc drive test mode may be received. As described earlier, information handling system 200 is preferably configurable to receive a command to initiate the testing of any removable storage media or disc drive devices. Also as mentioned, the test request is preferably received by CPU 202, however, other implementations are contemplated within the spirit and scope of the present disclosure, such as implementations having one or more application specific integrated circuits (ASIC) (not expressly shown). Depending generally on the specific implementation, the removable storage media or disc drive test request may be generated during POST execution, during loading of any device drivers as well as in a variety of other manners. Once a removable storage media device test request has been issued and received at 304, method 300 preferably proceeds to 306.

At 306, a determination as to whether removable storage media is present within the drive selected to be tested is preferably made. For example, if the drive being tested is CD-ROM disc drive 222, CD-ROM disc drive 222 may be checked to see if a removable media such as CD-ROM 104 is contained therein. If at 306 it is determined that the removable storage media drive being tested contains removable storage media, method 300 preferably proceeds to 308. Alternatively, if at 306 it is determined that the removable storage media drive being tested does not contain removable storage media, method 300 preferably proceeds to 310.

At 308, a test sequence operable to determine whether the removable storage media device selected for testing is operating properly is preferably initiated. Depending on the level of sophistication desired in testing the drive device, the test sequence may be configured to verify movement of a read and/or write head, such as sensor device 110, as well as that the reading implement of the read/write head is generating light and receiving back reflected light, for example. More thorough as well as less involved testing of removable storage media device operation are contemplated and considered within the scope of the present disclosure. For example, the ability of sensor device 110 to perform write operations on a segment of simulated CD-RW material may be implemented according to teachings of the present disclosure. Once the removable storage media device has been tested in accordance with a selected testing sequence initiated at 308, method 300 preferably proceeds to 312.

At 312, a notification indicating the results of the test sequence run at 308 is preferably generated. For example, if the removable storage media device appears to be operating as desired, a message stating the same may be generated and communicated to a user, such as a message displayed on panel display screen 226 or external display 230. Similarly, if the test sequence identifies one or more operational problems with the removable storage media device or a component thereof, such operational problems may be communicated to the user. Once the desired notification has been generated at 312, method 300 preferably ends at 314.

Alternatively, at 310, method 300 preferably determines whether there is simulated storage media present within the removable storage media device selected for testing, e.g., CD-ROM disc drive 222. In an information handling system 200 formed in accordance with teachings of the present disclosure, one or more settings maintained in memory may be evaluated to determine whether a simulated storage media is or should be present within the selected removable storage media drive. Similarly, one or more system jumpers (not expressly shown) may be consulted or integrated to determine whether simulated storage media is present within the selected drive. Also, one or more software routines may be included which are operable to determine whether a simulated storage media is present within the removable storage media device selected for testing.

If at 310 it is determined that no simulated storage media is present within the removable storage media device to be tested, method 300 preferably proceeds to 316. If, however, at 310 it is determined that simulated storage media is present within the removable storage media device to be tested, method 300 preferably proceeds to 318.

At 316, in response to the absence of both removable storage media and simulated storage media, an error message is preferably generated. As is the case with many removable storage media devices, such as CD-ROM device 222, the removable storage media device typically cannot be tested for proper operation without the presence of removable storage media. Further, if the removable storage device does not contain simulated storage media in accordance with teachings of the present disclosure, the removable storage device may be unavailable for testing. As such, an error message generated at 316, for example, could inform a user of the failed testing or inability to test the removable storage media device and further indicate any known or potential reasons identified for the failure. Once an appropriate error message has been generated at 316, method 300 preferably ends at 314.

At 318, similar to the processing occurring at 308, a test sequence operable to determine whether the removable storage media device being tested is properly operating is preferably initiated. One difference, however, between 308 and 318 is that at 318 the testing of the removable storage media device is occurring with respect to the simulated storage media as opposed to removable storage media that has been inserted to the removable storage media device at 308.

For example, in response to receiving a signal requesting that a selected removable media drive device be tested, data stored on a simulated storage media may be accessed to continue testing. The data access may be in the form of a data read using sensor device 110. As such, testing may include one or more read attempts. From the results of the read attempts, it may be determined whether one or more operational aspects of the removable storage media drive device are or are not operating properly. For example, if sensor device 110 were inoperable, the test routine might recognize the sensor device's 110 inability to read data stored on the simulated storage media. Preferably, such a test routinely includes testing the operability of other disc drive components such as spindle motor 102, and disc controller 112.

As described above, the level of sophistication desired for testing the operational aspects of a selected removable storage media device may vary from simple hardware tests to comprehensive tests involving reading information, writing information, component movement, etc. Once the removable storage device has been tested in accordance with test sequence initiated at 318, method 300 preferably proceeds to 320.

At 320, similar to 312, a notification indicating the results of the test sequence processed at 318 is preferably generated. Upon generation and communication of the appropriate notification at 320, method 300 preferably ends at 314.

Method 300 may be altered without departing from the spirit and scope of the present disclosure. For example, method 300 may be modified to prompt the user for the insertion of removable media or to replace an inoperable removable storage media device or device component. In addition, method 300 is intended to be illustrative only. Actual coding or hardwiring of method 300 or a similar embodiment may require additional steps to ensure proper performance, error checking, etc.

Teachings of the present disclosure may also be used to determine whether a removable storage media device contains removable storage media therein. For example, in such an implementation, the simulated storage media provided within the device preferably includes a known identifier. An identifier may include an identification number, a text sequence, a command to display a message, etc., maintained by and accessible to one or more device testing programs or ASIC. In determining whether removable storage media is present within a device, a program or ASIC controlling the testing preferably commands an appropriate device component, such as sensor device 110, to perform a read operation. In returning the results of the read operation to the test program or ASIC, the results may be compared with the identifier to determine whether the read results came from the simulated storage media or whether the read results came from a removable storage medium disposed in the device. For example, if the read results match the identifier, the test program or ASIC may determine that the read results came from the simulated storage media and, therefore, there is no removable storage media present in the device being tested. Alternatively, for example, if the read results do not match the identifier disposed on the included simulated storage media and accessible by the test program or ASIC, the test program or ASIC may determine that the read results came from removable storage media present in the device. Alternate implementations of determining whether removable storage media is present in a device are contemplated within the scope of the present disclosure.

Figure 4A:
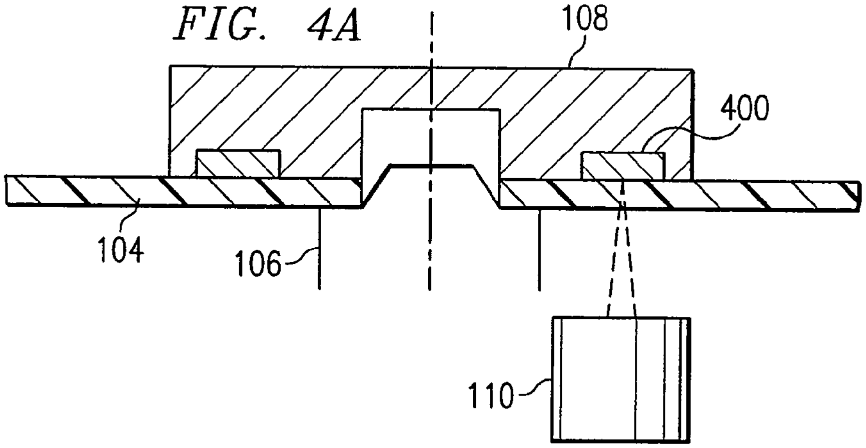
FIG. 4A is a schematic diagram generally illustrating a cross-sectional view of a CD-ROM disc drive with media present incorporating teachings of the present disclosure.
Figure 4B:
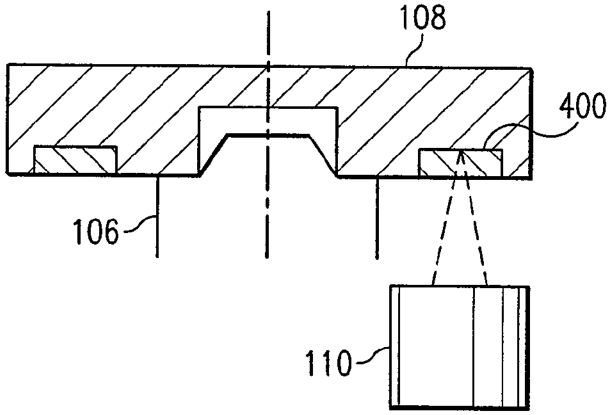
FIG. 4B is a schematic diagram generally illustrating an alternate view of a cross-section of a CD-ROM disc drive without media present incorporating teachings of the present disclosure.
Figure 5:
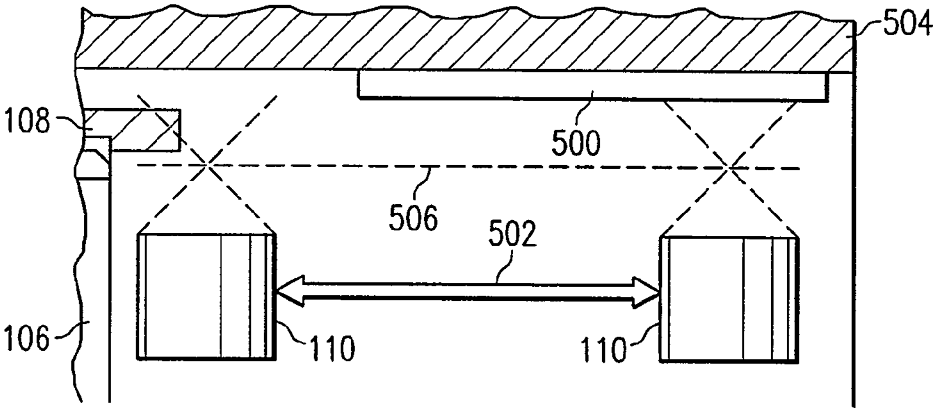
FIG. 5 is a schematic drawing generally illustrating a cross-sectional view of a portion of an alternate CD-ROM drive embodiment incorporating a hologram-based simulated storage media according to teachings of the present disclosure.

As mentioned above, simulation of storage media within a drive device may be implemented in a variety of ways as illustrated in FIG. 4A, FIG. 4B, and FIG. 5. Referring to FIG. 4A and FIG. 4B, in one embodiment, a simulated storage device may be defined by placing or simulating a portion of a CD-ROM disc, DVD-ROM disc, CD-RW disc etc., e.g., in the form of an annular ring 400, within the removable storage media drive, such as CD-ROM drive 222. Preferably, at least one of the properties of annular ring 400 matches that of the appropriate removable storage media, e.g., a CD-ROM disc. For example, in the case of CD-ROM disc drive 222 or 100, annular ring 400 preferably includes land 118 and pit 116 formations recognizable and/or readable by sensor device 110. In a further embodiment, annular ring 400 may be enabled to store data or binary information, permit information to be written thereto, as well as allow other operations.

Annular ring 400 is preferably arranged such that it is within sensing range 126 of sensor device 110 during testing and when there is no removable storage media present. Depending on the implementation chosen, the simulated storage media may be disposed such that the simulated media is moved within sensing range 126 of sensor device 110. Alternatively, the simulated storage media, e.g., annular ring 400, may be disposed such that sensor device 110 must be repositioned in order for the simulated storage media to be disposed within sensing range 126.

The exact placement of annular ring 400 may depend on a variety of design factors including, but not limited to, the geometry of the removable storage media device, sensing range 126 of sensor device 110, and horizontal versus vertical mounting. The placement of simulated storage media, e.g., annular ring 400, within the removable storage media drive should preferably not interfere with normal operation of the removable storage media drive device. For example, in the case of CD-ROM device 222, the simulated storage media should not interfere with the loading and unloading of CD-ROM disc 104. Also, the simulated storage media will preferably not interfere with the normal operation of spindle motor 102, sensor device 110 or disc controller 112. During testing of a removable storage media drive when no removable media is present, it is preferred that the simulated storage media be accessible by sensor device 110.

In operation of certain CD-ROM disc drives, clamp 108 is typically lowered on to CD-ROM disc 104 to secure it to turntable 106. In one embodiment, as illustrated in FIG. 4A and FIG. 4B, annular ring 400 may be included on clamp 108 assembly by embedding annular ring 400 therein. Such an embodiment will preferably not prevent clamp assembly 108 from frictionally maintaining CD-ROM disc 104 in place when present. Preferably, the axes (not expressly shown) of annular ring 400 and spindle motor 102 are generally aligned. In such an embodiment, annular ring 400 may be positioned above CD-ROM disc 104 when CD-ROM disc 104 is present, as illustrated in FIG. 4A. However, when the CD-ROM disc 104 is not present, annular ring 400 may be lowered to be within sensing range 126 of sensor device 110, as illustrated in FIG. 4B. In another embodiment, instead of lowering annular ring 400, the position of the sensor device 110 may be adjusted so as to be in a position to read, write or otherwise access data maintained by the simulated storage media, e.g., the annular ring 400.

Referring to FIG. 5, an alternate embodiment of a simulated storage media device is illustrated according to teachings of the present disclosure. As illustrated in FIG. 5, simulated storage media may be defined by placing a reflective hologram element 500 within the removable storage media drive. In a CD-ROM disc drive embodiment, the simulated storage device, e.g., hologram element 500, is preferably designed such that it may reflect back to the sensor device 110 an image which would typically be reflected from a CD-ROM disc appropriately positioned in the drive. For preferred functionality, at least one of the properties of hologram element

500 preferably matches that of the removable storage media, e.g., CD-ROM disc 104, a DVD-ROM, CD-RW, etc.

Again in a CD-ROM disc drive environment, for example, hologram element 500 is preferably arranged such that it may be positioned where it can be detected by sensor device 110. In one embodiment, hologram element 500 may be fabricated to represent a series of reflective image-producing areas, e.g., land 118 areas, alternating with non-image producing areas, e.g., pit 116 areas. This sequence is preferably appropriately aligned along and above a portion of travel path 502 of sensor device 110 to thereby simulate a portion of a spiral track, for example. In such an embodiment, hologram element 500 may be in the form of a strip disposed generally above travel path 502, for example. Sensor device 110 is preferably operable to detect an alternating sequence of land 118 and pit 116 transitions projected by hologram element 500 as sensor device 110 is moved along travel path 502. In another embodiment, hologram element 500 may be designed to mimic portions of the spiral grooves of a DVD-ROM.

Hologram element 500 may also be enabled to store information, e.g., data or a test pattern. In such an embodiment, sensor device 110 is preferably operable to read the information stored on hologram element 500, at least during a test phase and preferably when removable storage media, e.g., CD-ROM disc 104, is not present. Sensor devices 110 including more than one laser diode, such as sensor device 110 typically included in a CD-RW device and typically emitting lasers of different wavelength, may be used with alternating sequences of hologram elements 500 for tuning the light detecting diodes at different wavelengths. Tuning sensor device 110 may further include tuning or adjusting the associated electronics of sensor device 110. Hologram element 500 may also aid in detecting proper operation of sensor device 110.

The exact placement of hologram element 500 may depend on a variety of design factors including, but not limited to, the geometry of the disc drive device, sensing range 126 of sensor device 110, as well as whether the removable storage media device is horizontally or vertically mounted. In general, the placement of simulated storage media, e.g., hologram element 500, within the removable storage media drive will preferably not interfere with normal operation of the device. For example, the simulated storage media preferably does not interfere with the loading and unloading of a CD-ROM disc 104 or other removable storage media. Also, the simulated storage media preferably does not interfere with normal operation of spindle motor 102, sensor device 110, disc controller 112 or other device components. While testing the drive when no removable media is present, it is preferred that the built-in or integrated simulated storage media be accessible by sensor device 110.

In one embodiment, hologram element 500 may be placed above a lens assembly of sensor device 110 and above a plane 506 where sensor device 110 typically focuses to read information contained on CD-ROM disc 104, for example. Hologram element 500 may be placed on an inside, top cover of a drive enclosure casing or housing 504 of removable storage media device or information handling system into which a removable storage media drive has been incorporated. Hologram element 500 is preferably aligned along travel path 502 of sensor device 110. When CD-ROM disc 104 is not present, hologram element 500 preferably receives light from a laser diode of sensor device 110 and generates an image simulating a CD-ROM to sensor device 110. By utilizing the optical properties, characteristics and abilities of hologram element 500, an image simulating removable storage media properties is preferably projected within sensing range 126 such that sensor device 110 may detect the image at plane 506, proximate the reading surface of a CD-ROM disc 104. When CD-ROM disc 104 is present, hologram element 500 will preferably not receive any light from a laser diode of sensing device 110.

Although the disclosed embodiments have been described in detail, it should be understood that various changes, substitutions and alterations can be made to the embodiments without departing from their spirit and scope.

What is claimed is:

1. An information handling system comprising:

at least one processor;

memory operably coupled to the processor;

a removable media storage device operably coupled to both the processor and the memory, the removable media storage device configured to house a simulated storage media; and a program of instructions stored in the memory and executable by the processor, the program of instructions operable to cooperate with the simulated storage media to test at least one component of the removable media storage device.

2. The information handling system of claim 1, wherein:

the removable media storage device includes a sensor device; and the sensor device is positioned within a sensing range of the simulated storage media.

3. The information handling system of claim 1, wherein:

the removable media storage device includes a clamp mechanism configured to secure a removable non-simulated storage media in the removable media storage device; and the simulated storage media is coupled to the clamp mechanism.

4. The information handling system of claim 3, wherein the simulated storage media remains coupled to the clamp mechanism while a removable non-simulated storage media is secured in the removable media storage device by the clamp mechanism.

5. The information handling system of claim 1, wherein the simulated storage media is integral with one or more components of the removable media storage device.

6. The information handling system of claim 1, further comprising:

the removable media storage device including a sensor device; and the simulated storage media operable to test the operation of the sensor device.

7. The information handling system of claim 6, further comprising the program of instructions operable to cooperate with the simulated storage media to tune the operation of the sensor device.

8. The information handling system of claim 1, wherein the removable media storage device is configured to house the simulated storage media during normal operation of the removable media storage device with a removable non-simulated storage media positioned in the removable media storage device.

9. The information handling system of claim 1, wherein the simulated storage media is positioned in the removable media storage device such that the simulated storage media may be used for testing the at least one component of the removable media storage device even while a removable non-simulated storage media is also positioned in the removable media storage device.

10. The information handling system of claim 1, wherein the simulated storage media comprises an annular ring integrated with one or more components of the removable media storage device.

11. The information handling system of claim 1, wherein the simulated storage media comprises a hologram that mimics at least one characteristic of a non-simulated removable storage media.

12. An information handling system comprising:

a media storage device configured to house a simulated storage media;

a sensor device configured to interact with the simulated storage media during a test phase to test at least one component of the media storage device;

the media storage device further configured to receive a removable storage media;

the sensor device configured to interact with a removable non-simulated media storage device during normal operation of the media storage device; and wherein the simulated storage media housed in the media storage device does not interfere with the interaction between the sensor device and the removable non-simulated media storage device during normal operation of the media storage device.

13. The information handling system of claim 12, wherein the simulated storage media comprises a hologram.

14. The information handling system of claim 12, wherein the simulated storage media housed in the media storage device does not interfere with the insertion and removal of the removable non-simulated media storage device into and out of the media storage device.

15. The information handling system of claim 12, wherein the simulated storage media is integral with one or more components of the media storage device.

16. The information handling system of claim 12, wherein:

the removable non-simulated storage media defines an outer perimeter; and the simulated storage media defines an outer perimeter having a significantly different size than the outer perimeter of the removable non-simulated storage media.

17. The information handling system of claim 12, wherein the media storage device includes the sensor device.

18. A method for testing a media storage device, comprising:

receiving a request to enter a test mode of the media storage device;

executing a test sequence using a simulated storage media disposed in the media storage device, the simulated storage media simulating at least one characteristic of a non-simulated storage media configured for use with the media storage device; and based on the results of the test sequence, generating a notification indicating one or more characteristic of one or more components of the media storage device.

19. The method of claim 18, further comprising:

automatically determining that a non-simulated storage media is not present in the media storage device; and initiating the test sequence using the simulated storage media in response to determining that a non-simulated storage media is not present in the media storage device.

20. The method of claim 18, further comprising:

in response to receiving the request to enter the test mode, automatically moving a sensor device from a normal operation position to a test mode position; and operating the sensor device to interact with the simulated storage media during execution of the test sequence.

* * * * *